Sept. 13, 1966 HEINZ-HUBERT MEURER 3,272,920
PORTABLE TELEVISION RECEIVER INCLUDING MEASURING DEVICE
Filed April 29, 1965
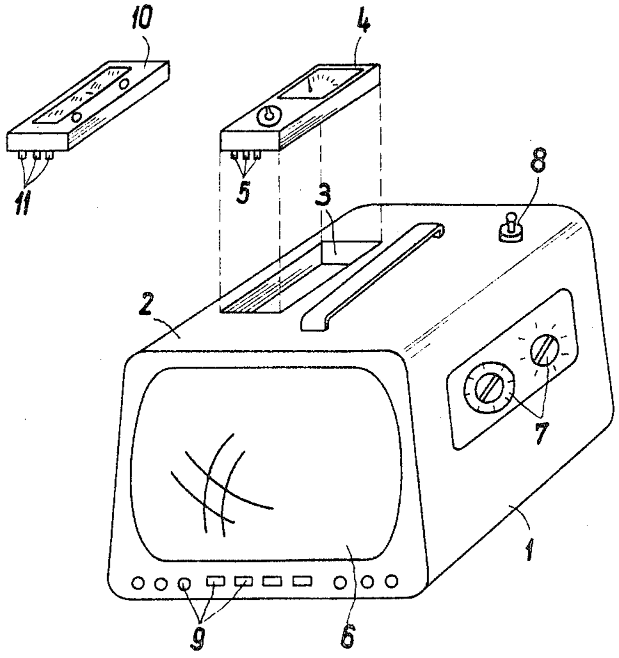
Inventor:
Heinz-H. Meurer United States Patent Office 3,272,920

Patented Sept. 13, 1966

3,272,920
PORTABLE TELEVISION RECEIVER INCLUDING MEASURING DEVICE

Heinz-Hubert Meurer, Kronach, Upper Franconia, Germany, assignor to Loewe Opta G.m.b.H., Berlin, Germany, a company of Germany Filed Apr. 29, 1965, Ser. No. 452,461
Claims priority, application Germany, May 6, 1964, Reg. No. (utility model) 1,902,049
4 Claims. (Cl. 178—7.9)

In erecting television antennas for VHF or UHF reception accurate alignment of the antennas is only achievable without special aids when the transmitter is situated within range of vision. In all other cases special antenna testing set and/or antenna voltage measuring devices have to be used.

For example television antenna testing instruments for larger reception antenna systems are known which serve for aligning the antennas, for levelling the antenna amplifiers and for tracing and eliminating sources of disturbance and faults. Such testing instruments, outwardly similar to a portable cathode ray oscillograph, contain a complete television receiving equipment including a small picture tube and a monitor speaker, and also an antenna voltage measuring instrument or a measuring device with which the antenna voltage can be ascertained by using the picture tube. As a measure for the antenna voltage and/or the field strength prevailing at the place of reception usually serves the control D.C. potential generated in a television receiver and providing the automatic gain control.

The testing instruments described are in their conventional designs relatively expensive and only suitable for said special purposes.

In accordance with the invention a portable television set contains in a depression a field strength measuring instrument.

For electrical connection to the television reception circuit the measuring instrument appropriately has contact elements engaging with corresponding opposed contacts in the depression.

The invention will be described in greater detail with reference to the accompanying drawing. A portable television receiver 1 of conventional design contains in its top 2 a rectangular depression 3 with a field strength measuring instrument 4, i.e. a moving coil measuring instrument calibrated in $\mu$v. or mv. The measuring instrument is dimensioned so that when it is inserted it fits with its visible plane flush with the surface of the case. On the underside of the measuring instrument are plug contacts 5 e.g. V-type contacts, which when the instrument is inserted engage in corresponding sockets in the floor of depression 3 and make electric connection to the television reception circuit. No. 6 designates the picture tube, 7 the channel selector and 8 a telescopic television antenna sliding in the receiver case; control knobs and push buttons 9 are disposed below the screen.

Instead of the measuring instrument 4 a radio adapter for the reception of VHF broadcasts similar in its outside dimensions can be optionally inserted, whereby the adapter need only have such stages which are not present in the television receiver portion. It is therefore characterized e.g. apart from the mechanical tuning and indicating means by only an HF stage, an oscillator and mixer stage and an intermediate frequency converter stage. The operating voltage is taken up from the power supply of the television receiver. The electric connection between the radio adapter and the television receiver is made by plug pins 11, which can be disposed in displaced relation to the plug pins 5 of the measuring instrument and engage in correspondingly adapted plug sockets of the depression.

To protect the inserted adapter a guard portion can be used in the shape e.g. of a lid slidable into the receiver case. This lid at the same time serves as a flush closure of depression 3 when the receiver is used without the adapter.

What is claimed is:

1. A portable television set in combination with an instrument for measuring field strength received with said television set; said measuring instrument having contact elements for electrical connection with the receiver circuit, said contact elements engaging with corresponding opposed contact elements disposed in a depression of said television set, said depression containing said measuring instrument.

2. A portable television set as defined in claim 1 wherein said depression of said television set contains a radio receiver having contact elements for electrical connection with the television set circuit, said contact elements engaging in corresponding opposed contact elements disposed in said depression of said television receiver.

3. A portable television set in combination with an instrument for measuring field strength received with said television set; said measuring instrument having contact elements for electrical connection with the receiver circuit, said contact elements engaging with corresponding opposed contact elements disposed in a depression of said television set, said depression containing said measuring instrument and being arranged in the top of the television receiver cabinet.

4. In a portable television set containing a depression for a field-strength meter or a radio receiver, a detachable cover being provided for closing said depression only when instruments are not inserted.

References Cited by the Examiner

UNITED STATES PATENTS 2,789,158 4/1957 Livingston ---------- 178—5.8

FOREIGN PATENTS 938,384 1/1956 Germany.

DAVID G. REDINBAUGH, *Primary Examiner.*

R. L. RICHARDSON, *Assistant Examiner.*